United States Patent Office

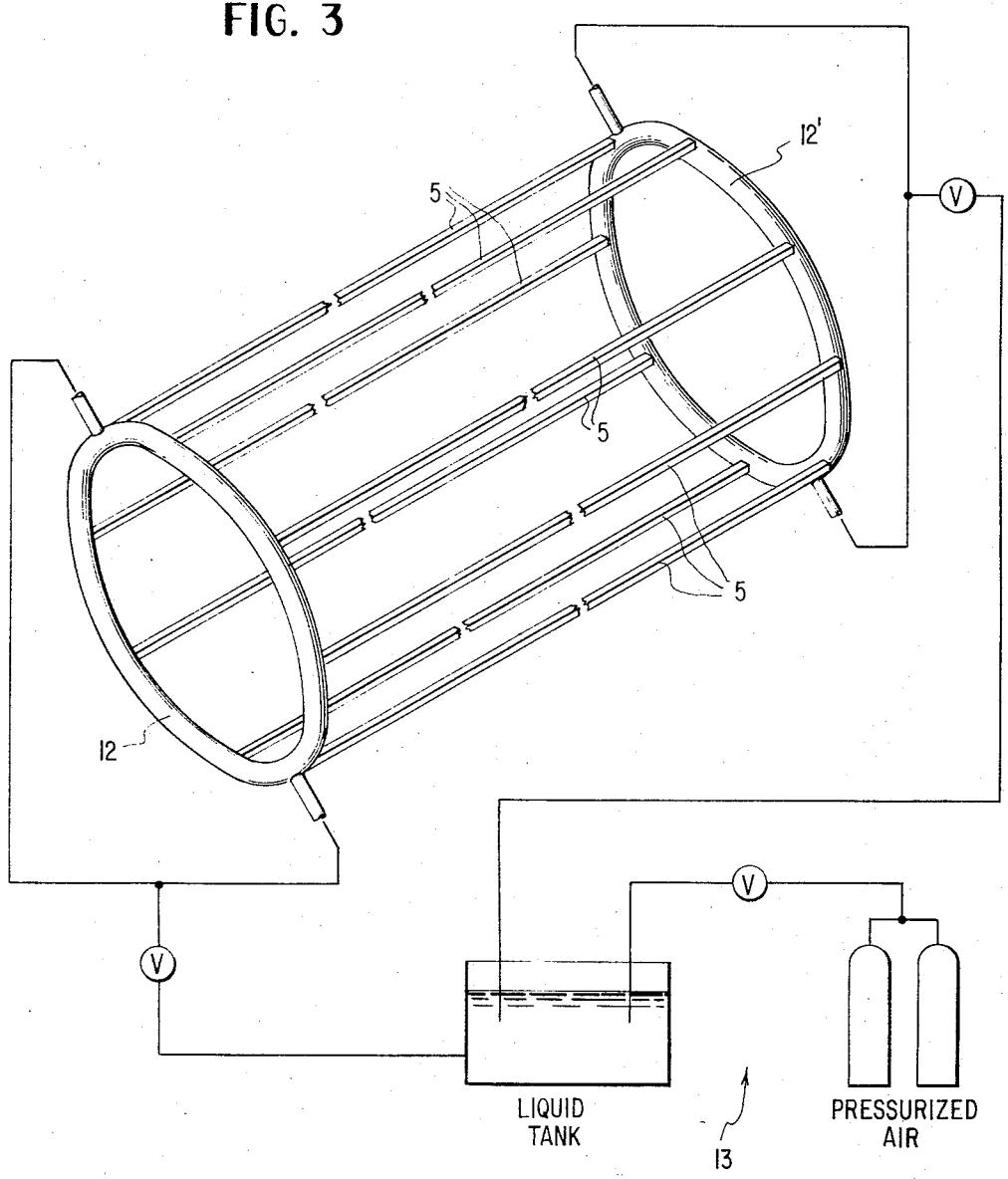

3,364,896
Patented Jan. 23, 1968

3,364,896
DEVICE FOR LAUNCHING TORPEDOES FROM A SUBMARINE TUBE
Gunnar Hedenberg, Stora Nygatan 14c, Uddevalla, Sweden
Filed May 19, 1966, Ser. No. 551,281
Claims priority, application Sweden, May 19, 1965, 6,540/65
1 Claim. (Cl. 114—238)

ABSTRACT OF THE DISCLOSURE

Torpedo launching tube comprised of a series of longitudinally extending box beams and yoke beams arranged in alternating relationship along the circumference of the tube. Inside of each of the yoke beams is a movable carriage having a roller which acts against the exterior of a hose arranged inside the yoke beam to compress the hose against the interior of the yoke beam. The carriages are connected via entrainer means with a conveyor device for transporting a torpedo through the tube. The tube has at each of its ends an annular distributor channel to which the hoses inside the yoke beams are connected. Facilities are provided for supplying a pressure medium to either one of the annular distributor channels and thus to the hoses to form a pressure wave which propels the carriages and the conveyor device through the tube. There are also facilities for supplying water behind the torpedo in the tube when the torpedo is launched.

---

This invention relates to a device for launching torpedoes from a submarine tube.

It is an object of this invention to provide an improved device of this type which will prevent the creation of sounds or other phenomena that might betray the launching of the torpedo.

According to the present invention, the tube is composed of a series of longitudinally extending box beams and yoke beams arranged in alternating relationship along the circumference of the tube, and is inside each of said yoke beams provided with a movable carriage having a roll to be rolled off against the exterior of a hose arranged inside the yoke beam to thus compress the hose against the interior of the yoke beam, each carriage being connected via an entrainer means with a conveyor means for transporting a torpedo through the tube, the tube having at each of its ends an annular distributor channel to which the hoses inside the yoke beams are connected, and there being provided means for supplying a pressure medium to either one of the annular distributor channels, and means for supplying water to the tube behind the torpedo when the torpedo is launched off.

Figure 1:
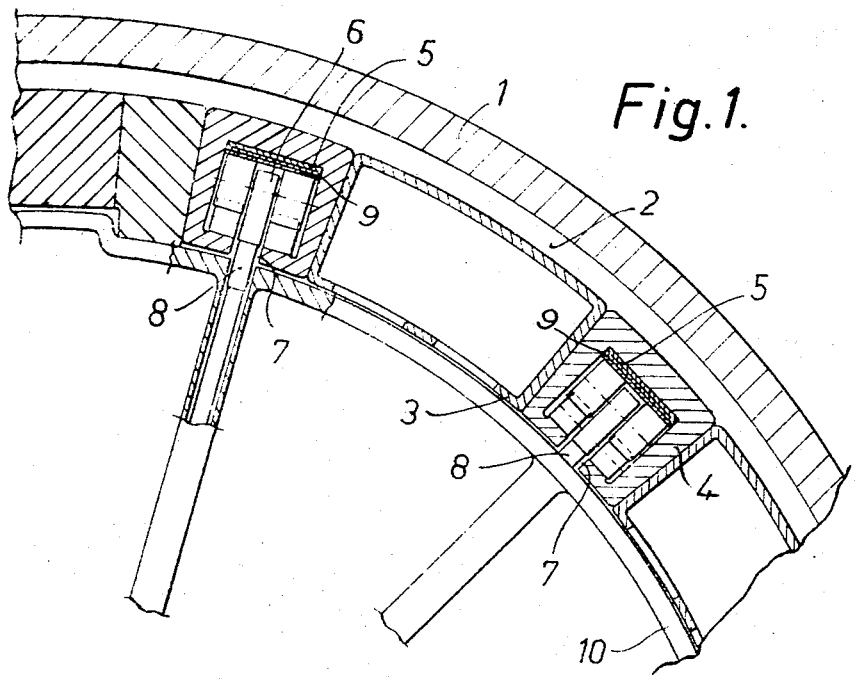
Figure 2:
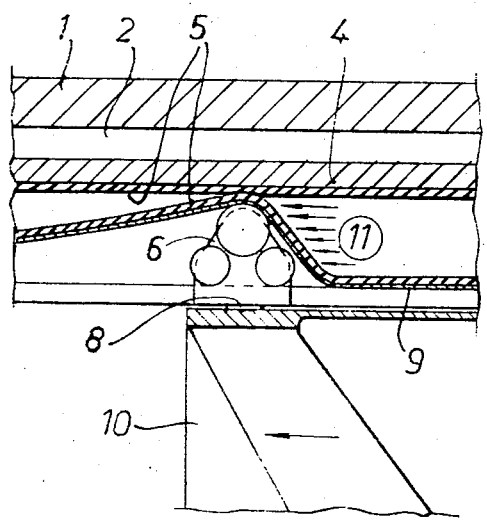

An embodiment of the device will be described below with reference to the attached drawing. It will be understood, however, that the present invention is not in any way restricted to this embodiment. In the drawing, FIG. 1 is a partial cross section through a torpedo launching device according to the invention while FIG. 2 is a partial longitudinal section through this device.

The device as shown in the drawing comprises an exterior casing 1 lined with a shock-absorbing material 2 and surrounding a series of box beams 3 and yoke beams 4 which together form an annular torpedo tube.

A hose 5 of elastic material is accommodated in the yoke of each yoke beam 4 and is at each of its ends connected to an annular distributor channer 12 and 12' at each end of the torpedo tube. These distributor channels 12 and 12' can be connected to a hydraulic system 13. A carriage 6 is arranged to run inside the yoke beam and has rolls arranged to roll on the radially interior inside edge of the yoke beam and to compress the hose between a roll surface and the radially exterior inside edge of the yoke beam. The radially interior edge of the yoke beam has a groove 7 extending longitudinally of said beam and accommodating an entrainer member 8 which is secured to the carriage and adapted to move along said groove. A torpedo conveyor means 10 having spoke-like members for each yoke beam 4 is provided for moving a torpedo (not shown) through the tube. A band 9 is arranged between the outermost of said rolls and the hose 5 to prevent the hose from creeping into groove 7 and from being pressed in between the rolls of the carriage. The band 9 is preferably made of stiff material and often it will be suitable to superimpose a plurality of thin bands on top of each other, so that these bands will then together form a strong, stiff band.

The box beams 3 have the functions to maintain the yoke beams 4 in their positions and to form channels for admission of the required amount of water behind the torpedo when the torpedo is launched.

When a torpedo is to be launched, pressure medium is supplied via the annular channel in the interior end of the torpedo tube. This results in a "pressure wave" 11 which propels the carriages with their entrainer members in the launching direction. After the completion of each launching operation the carriages with their appertaining entrainer members are caused to return by means of pressure medium being supplied to the exterior end of the torpedo tube via the exterior annular channel 12'.

I claim:
1. A device for launching torpedoes from a submarine tube in which said tube is composed of a plurality of longitudinally extending box beams and yoke beams arranged in alternating relationship along the circumference of the tube, and is inside each of said yoke beams provided with a movable carriage having a roller to be rolled off against the exterior of a hose arranged inside the yoke beam to thus compress the hose against the interior of the yoke beam, each carriage being connected via an entrainer means with a conveyor means for transporting a torpedo through the tube, the tube having at each of its ends an annular distributor channel to which the hoses inside the yoke beams are connected, and there being provided means for supplying a pressure medium to either one of the annular distributor channels, and means for supplying water to the tube behind the torpedo when the torpedo is launched off.

References Cited

UNITED STATES PATENTS 2,625,899  1/1953  Miller _____ 114—238
3,108,562  10/1963  Riedel _____ 114—238

MILTON BUCHLER, *Primary Examiner.*
T. M. BLIX, *Assistant Examiner.*